(12) United States Patent
Ling et al.

(10) Patent No.: US 10,969,545 B2
(45) Date of Patent: Apr. 6, 2021

(54) APPARATUS AND METHOD FOR REALISING BILINEAR TEMPERATURE COMPENSATION OF ARRAY WAVEGUIDE GRATING

(71) Applicant: Accelink Technologies Co., Ltd., Hubei (CN)

(72) Inventors: Jiuhong Ling, Hubei (CN); Fan Wu, Hubei (CN); Xiangjian Kong, Hubei (CN); Changan Li, Hubei (CN); Jiayan Hu, Hubei (CN)

(73) Assignee: Accelink Technologies Co., Ltd.

( * ) Notice: Subject to any disclaimer, the term of this patent is extended or adjusted under 35 U.S.C. 154(b) by 0 days.

(21) Appl. No.: 16/759,795

(22) PCT Filed: Dec. 25, 2017

(86) PCT No.: PCT/CN2017/118168
§ 371 (c)(1),
(2) Date: Sep. 18, 2020

(87) PCT Pub. No.: WO2019/041679
PCT Pub. Date: Mar. 7, 2019

(65) Prior Publication Data
US 2021/0055476 A1    Feb. 25, 2021

(30) Foreign Application Priority Data

Aug. 30, 2017 (CN) .......................... 201710764806.1

(51) Int. Cl.
*G02B 6/34* (2006.01)
*G02B 6/12* (2006.01)

(52) U.S. Cl.
CPC ........ *G02B 6/1203* (2013.01); *G02B 6/12011* (2013.01); *G02B 6/12016* (2013.01)

(58) Field of Classification Search
CPC .............. G02B 6/1203; G02B 6/12016; G02B 6/12011
See application file for complete search history.

(56) References Cited

U.S. PATENT DOCUMENTS 6,738,545 B1    5/2004  Purchase et al.
9,519,103 B2 *  12/2016 Huang ............... G02B 6/12009
(Continued)

FOREIGN PATENT DOCUMENTS

CN        1392961 A     1/2003
CN      101099098 A     1/2008
(Continued)

OTHER PUBLICATIONS

Chinese Search Report for Application No. CN201710764806.1, dated Mar. 19, 2019, pp. 1-2.
(Continued)

*Primary Examiner* — Ellen E Kim
(74) *Attorney, Agent, or Firm* — Lerner, David, Littenberg, Krumholz & Mentlik, LLP (57) ABSTRACT

An apparatus and method for temperature compensation, belonging to the technical field of optical communications, and particularly an apparatus and method for implementing bilinear temperature compensation of an arrayed waveguide grating is disclosed. The apparatus consists of two drivers. A first driver performs linear compensation in a range lower than normal temperature 25° C. to −40° C. (low-temperature area) or a range higher than ambient temperature 25° C. to 85° C. (high-temperature area). A second driver is used to realize nonlinear compensation of superimposed effect of AWG chip wavelength/temperature in another temperature area. Two parts of the chip after being divided have different relative displacement/effective compensation amounts in different temperature ranges, having over-compensation in the high-temperature area and under-compensation in the (Continued)

low-temperature area, so that a center wavelength of the AWG chip appears as two gentle curves with temperature change. The residual nonlinear temperature effect is effectively reduced.

10 Claims, 5 Drawing Sheets

(56) References Cited

U.S. PATENT DOCUMENTS

| | | | |
|---|---|---|---|
| 2002/0181871 A1* | 12/2002 | Saito | G02B 6/12033 |
| | | | 385/37 |
| 2004/0165811 A1 | 8/2004 | Cole et al. | |
| 2008/0135169 A1* | 6/2008 | Rhee | G02B 6/12016 |
| | | | 156/256 |
| 2008/0199130 A1* | 8/2008 | Hasegawa | G02B 6/12014 |
| | | | 385/31 |
| 2010/0278483 A1* | 11/2010 | Hasegawa | G02B 6/1203 |
| | | | 385/37 |
| 2012/0195553 A1* | 8/2012 | Hasegawa | G02B 6/12014 |
| | | | 385/37 |
| 2018/0164518 A1 | 6/2018 | Hu et al. | |

FOREIGN PATENT DOCUMENTS

| | | |
|---|---|---|
| CN | 102540350 A | 7/2012 |
| CN | 103018825 A | 4/2013 |
| CN | 104280821 A | 1/2015 |
| CN | 104765103 A | 7/2015 |
| CN | 107490823 A | 12/2017 |
| CN | 206725806 U | 12/2017 |
| KR | 100942070 B1 | 2/2010 |

OTHER PUBLICATIONS

International Search Report for Application No. PCT/CN2017/118168, dated May 9, 2018, pp. 1-2.

* cited by examiner

APPARATUS AND METHOD FOR REALISING BILINEAR TEMPERATURE COMPENSATION OF ARRAY WAVEGUIDE GRATING

CROSS-REFERENCE

The present disclosure claims a benefit of, and priority of Chinese Patent Application No. 201710764806.1 filed on Aug. 30, 2017, the disclosure of which is hereby expressly incorporated by reference herein in its entirety.

TECHNICAL FIELD OF THE DISCLOSURE

The present disclosure relates to an apparatus and method for temperature compensation, belonging to the technical field of optical communication, and in particular relates to an apparatus and method for realizing bilinear temperature compensation of an arrayed waveguide grating (AWG).

BACKGROUND

Usually, an AWG chip is a silicon-based planar optical waveguide element, and its center wavelength varies greatly with a normal temperature at about 11 pm/° C. AMG devices generally adopt temperature compensation techniques to maintain a stable wavelength in order to enable the AWG chip to work normally at a working ambient temperature.

One of temperature compensation techniques of the AWG chip is a manner of mechanical movement. For example, in Patent CN101099098A, a solution for temperature compensation of an AWG chip is described, wherein the AWG chip is divided into two parts of 6a and 6b, and the part 6a is driven by a driver to move relatively to the part 6b to compensate a wavelength offset of the AWG chip resulted from temperature variations. In this solution, a wavelength variation is in a linear relation with the temperature variation.

In fact, the variation of wavelength λ of the AWG chip with the temperature T is not purely in a single linear relationship, but in a nonlinear relationship, as shown in following Formula 1:

$$d\lambda = a*dT^2 + b*dT + c \qquad \text{[Formula 1]}$$

In this solution, its quadratic term cannot be compensated. After a single linear compensation, a temperature/wavelength variation curve is shown as curves c in FIG. 13 and FIG. 14, which are a parabola and represent residual nonlinear effects of the wavelength/temperature. It can be seen from the curve c in FIG. 14 that a variation rate of the wavelength increases as the variation of temperature range increases, and the wavelength variation reaches more than 60 pm at –40-85° C.

In recent years, as application scenarios of AWG devices extend from indoor to outdoor, that is, a working environment temperature is required to accomplish –40° C. to 85° C., a wavelength offset increasement of AWG chip with the temperature will lead to a sharp deterioration of other related indicators of AWG chips. Therefore, higher requirements are imposed on the wavelength control technology.

Figure 14:
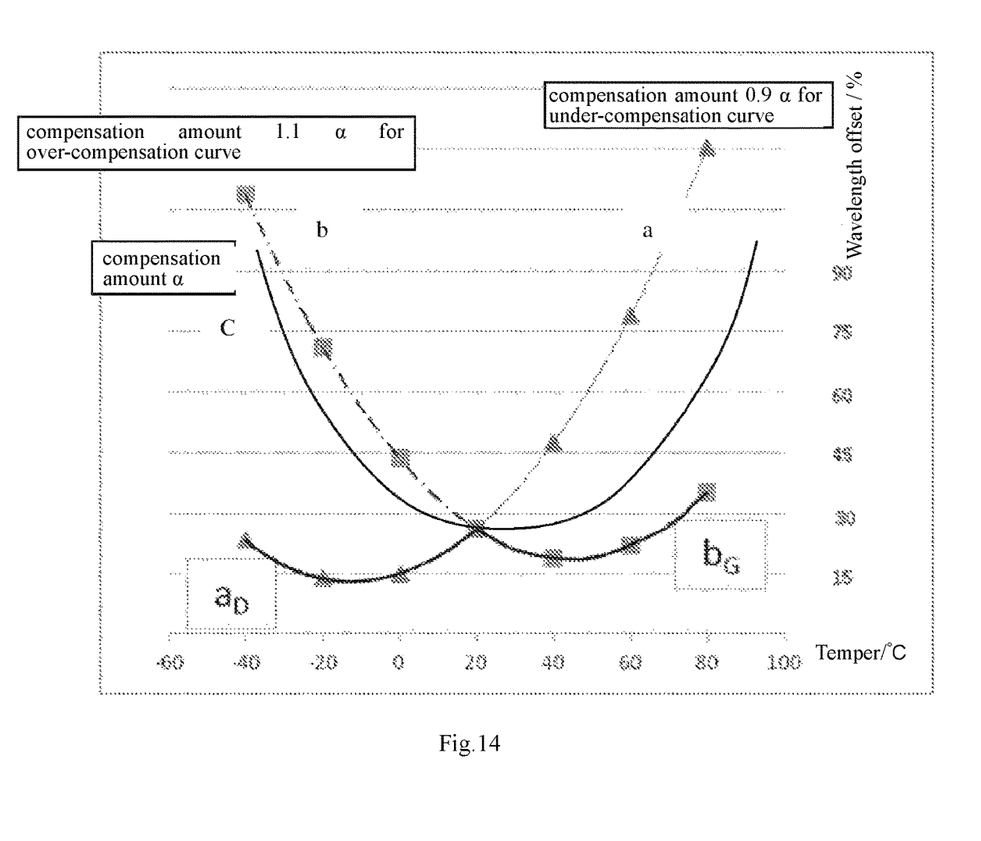
FIG. 14 is a schematic diagram showing a temperature-wavelength compensation curve of an AWG chip of an apparatus of the present disclosure.

In order to reduce the wavelength offset in a range of –40° C. to 85° C., a compensation method for temperature segment is proposed, wherein a curve b as shown in FIG. 14 is an over-compensation curve, in which a segment of over-compensation curve $b_G$ for AWG chip is made in a high-temperature area; and the curve c as shown in FIG. 14 is under-compensation curve, in which a segment of under-compensation curve $a_D$ is made for AWG chip in low temperature area, so that there are different compensation amounts for AWG chip in different temperature segments and the compensation curve is gentle, the temperature range can be divided into at least two segments or even a plurality of segments. The present disclosure provides an apparatus for realizing bilinear temperature compensation of an arrayed waveguide grating, so that the wavelength offset of the AWG chip is controlled within a relatively small range, and the wavelength offset reaches+/–15 pm within the range of –40° C. to 85° C.

SUMMARY

The present disclosure mainly solves the problem in the prior art that the wavelength of AWG chip offsets with the temperature, and it proposes an apparatus and method for realizing bilinear temperature compensation of an arrayed waveguide grating. In the apparatus and method, two drivers are used to implement a linear compensation and a nonlinear compensation of superposition effect respectively, so that different relative displacements/effective compensation amounts occur in different temperature ranges for two parts of divided chip optical path, so that a variation of the center wavelength of the AWG chip with temperature appears as two gentle curves, which can effectively reduce the residual nonlinear temperature effects. The present disclosure achieves a wavelength offset below 30 pm in the temperature range of –40° C. to 80° C., and thus the present disclosure can be used in outdoor applications.

The above technical problem of the present disclosure is mainly solved by the following technical solutions:

An apparatus for bilinear temperature compensation of an arrayed waveguide grating, comprising:

a first driver having a first driving rod, two ends of the first driving rod being respectively connected to a first sub-section and a second sub-section of an AWG chip which are relatively movable with each other;

a second driver having a second driving rod, a deformation of the second driving rod being different from that of the first driving rod in a part of a temperature range, one end of the second driving rod being connected to the first sub-section of the AWG chip and the other end being connected to a force-bearing end which is relatively fixed to a position on an end face of the first driving rod on the second sub-section;

wherein the first driving rod is provided with a retractable and/or rotatable elastic part.

Preferably, in the above-mentioned apparatus for bilinear temperature compensation of an arrayed waveguide grating, a ball is provided between the second driving rod and the force-bearing end face;

and/or, an end face, contacting the force-bearing end face, of the second driving rod, is pointed or arc in shape.

Preferably, in the above mentioned apparatus for bilinear temperature compensation of an arrayed waveguide grating, the first driving rod is L-shaped, one side of which is parallel to the second driving rod, while the other side acting as the force-bearing end face is perpendicular to an end face of the second driving rod.

Preferably, in the above-mentioned device for bilinear temperature compensation of an arrayed waveguide grating, both the first drive rod and the second drive rod have an identical thermal expansion coefficient while different lengths.

Preferably, in the above-mentioned device for bilinear temperature compensation of an arrayed waveguide grating, a length $L_1$ of the first driving rod and a length $L_2$ of the second driving rod are subject to the following conditions:

$$w\alpha = L_1 * \partial_1 + L_2 * \partial_2$$

$$\alpha = k_1 + r * k_2$$

where $k_1$ is an expansion and contraction quantity per temperature unit of the first driver caused by thermal expansion-contraction, $k_2$ is an expansion and contraction quantity of the second driver caused per temperature unit by thermal expansion-contraction, r is a proportionality coefficient related to rigidity and structural shapes of the two drivers and can be obtained through a stress analysis calculation simulation or experiment; $\partial_1$ is a linear expansion coefficient of the first driving rod, $\partial_2$ is a linear expansion coefficient of the second driving rod, a is a distance of movement per temperature unit, and w is a compensation amount.

Preferably, in the above-mentioned apparatus for bilinear temperature compensation of an arrayed waveguide grating, a number of the second driving rods is two or more than two, and lengths of the second driving rods are different with each other.

Preferably, in the above mentioned device for bilinear temperature compensation of an arrayed waveguide grating, a number of the second driving rods is two and the second driving rods have the same expansion coefficient as that of the first driving rod; one of the second driving rods is longer than the first driving rod while the other of the second driving rods is shorter than the first driving rod.

A method for bilinear temperature compensation of an arrayed waveguide grating, comprising:

using a first driving rod connecting two sub-sections of an AWG chip to drive the two sub-sections to relatively move between each other;

providing a second driving rod between the two sub-sections of the AWG chip, wherein one end of the second driving rod is in detachable contact with a force-bearing end face which is relatively fixed with respect to one end face of the first drive rod; and using a deformation amount of the second driving rod which is different from that of the first driving rod to vary an elastic deformation of the first driving rod.

Preferably, in the above mentioned method for bilinear temperature compensation of an arrayed waveguide grating, in a part of temperature segments, the first driving rod is deformed due to the contact between the second driving rod and the force-bearing end face; in a part of the temperature range, a shape of the deformed first driving rod recovers due to a separation of the second driving rod from the force-bearing end face.

Preferably, in the above-mentioned method for bilinear temperature compensation of an arrayed waveguide grating, what is characterized in that, at a normal temperature, a length of the second driving rod is greater than that of the first driving rod;

when a temperature is above the normal temperature, an expansion amount of the second driving rod is greater than that of the first driving rod, and the second driving rod stretches the first driving rod; and when the temperature is below the normal temperature, a contraction amount of the second drive rod is greater than that of the first drive rod, and the second drive rod is separated from the force-bearing end face.

Preferably, in the above-mentioned method for bilinear temperature compensation of an arrayed waveguide grating, what is characterized in that, at a normal temperature, a length of the second driving rod is smaller than that of the first driving rod;

when a temperature is above the normal temperature, an expansion amount of the second driving rod is smaller than that of the first driving rod, and the second driving rod is separated from the force-bearing end face; and when the temperature is below the normal temperature, a contraction amount of the second drive rod is smaller than that of the first drive rod, and the first drive rod is deformed due to the contacts between the second drive rod and the force-bearing end face.

Therefore, the present disclosure has the following advantages:

1. in the present disclosure, the variations of center wavelength of the AWG chip with the temperature may appear as two gentle curves by using two drivers with different linear expansion lengths and/or elastic deformation to achieve different compensation coefficients in different temperature ranges;

2. in the present disclosure, the wavelength offset within the temperature range of −40° C. to 80° C. is less than 30 pm and the present disclosure can be applied in outdoor scenes.

BRIEF DESCRIPTION OF THE DRAWINGS

where c represents a compensation curve with a compensation amount of $\alpha$.

a represents an under-compensation curve with a compensation amount of $0.9\alpha$.

b represents an over-compensation curve with a compensation amount of $1.1\alpha$.

$a_D$ is an under-compensation curve of the under-compensation curve at a low temperature.

$b_G$ is an over-compensation curve of the over-compensation curve at a high temperature.

DETAILED DESCRIPTION

The technical solutions of the present disclosure will be further described in detail below by referring to the embodiments and the accompanying drawings.

Embodiment

Figure 1:
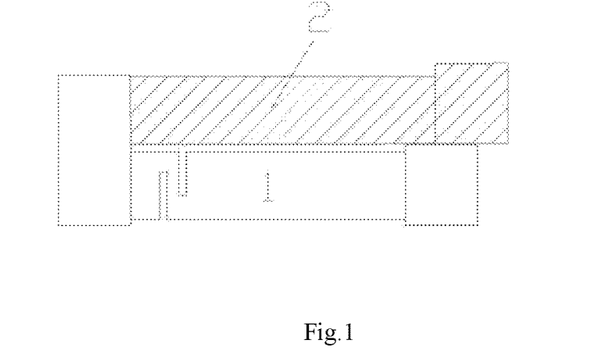
FIG. 1 is a structural diagram of an apparatus of the present disclosure.

As shown in FIG. 1, an apparatus of the present disclosure comprises a first driver 1 and a second driver 2.

Figure 2:
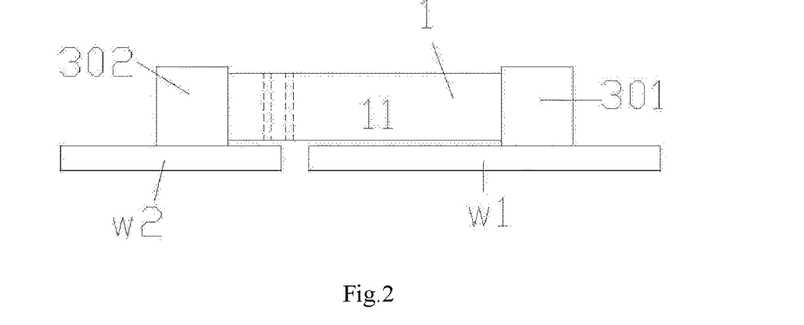
FIG. 2 is a schematic diagram showing a first driver of an apparatus of the present disclosure provided on an AWG chip.

As shown in FIG. 2, in a specific example, the first driver 1 includes a driving rod 11, a base 301 and a base 302 being provided at each end of the driving rod 11 respectively. The bases may be made of, but is not limited to, a transparent material with a low expansion coefficient such as quartz, glass, etc. The connections between the driving rod 11 and the bases may be in a manner of bonding, etc. The bases 301 and 302 are respectively fixed on a first part w1 and a second part w2 of a divided AWG chip.

Figure 3:
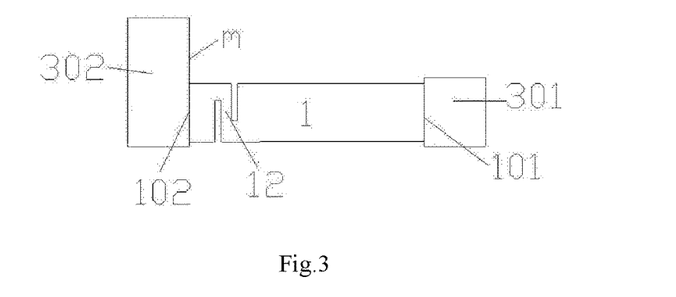
FIG. 3 is a view showing an embodiment of a first driver of an apparatus of the present disclosure.

As shown in FIG. 3, the driving rod 11 of the first driver 1 is provided with an elastic structure 12 which is elastic deformable along a length direction of the driving rod 11; in a specific example, an end face of the base 302 of the first driver 1 is larger than that of the driving rod 11 in area, and a joint common face between the base 302 of the first driver 1 and the driving rod 11 is configured to be a force-bearing end face m.

Figure 4:
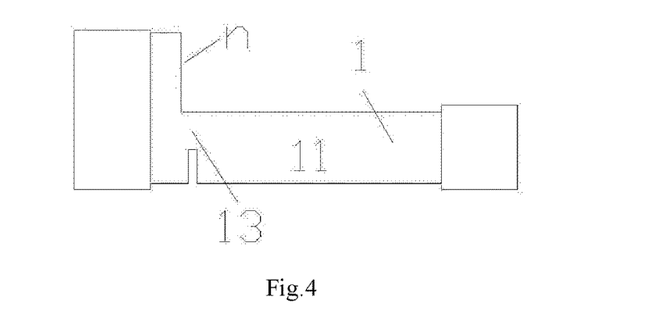
FIG. 4 is a view showing another embodiment of a first driver of an apparatus of the present disclosure.

As shown in FIG. 4, in the second example, the driving rod 11 of the first driver 1 is L-shaped and provided an end face n as the force-bearing end face. Further, the driving rod 11 has an elastic structure 13.

Figure 5:
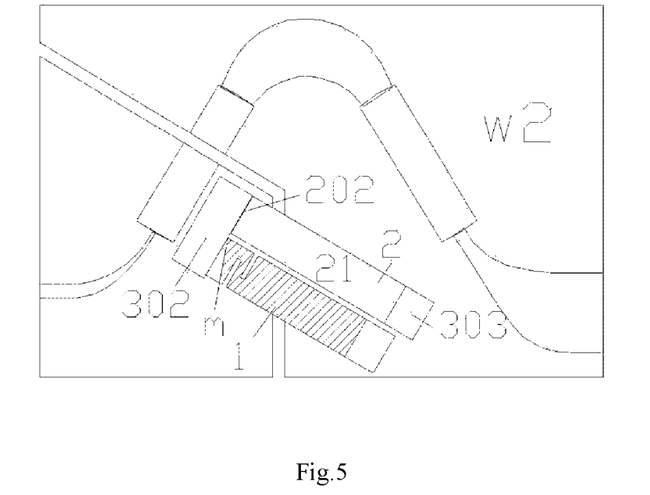
FIG. 5 is a schematic diagram showing an embodiment of an arrangement of a second driver of the present disclosure.

As shown in FIG. 5, the second driver 2 includes a driving rod 21 and a base 303. One end face of the driving rod 21 of the second driver 2 is fixed to the base 303, and the base 303 is fixed to the second part w2 of the AWG chip, and then the position of the base 303 on the second part w2 of the AWG chip is selected to enable the other end face 202 of the second driver 2 to contact the force-bearing end face m or n of the first driver 1.

Figure 6:
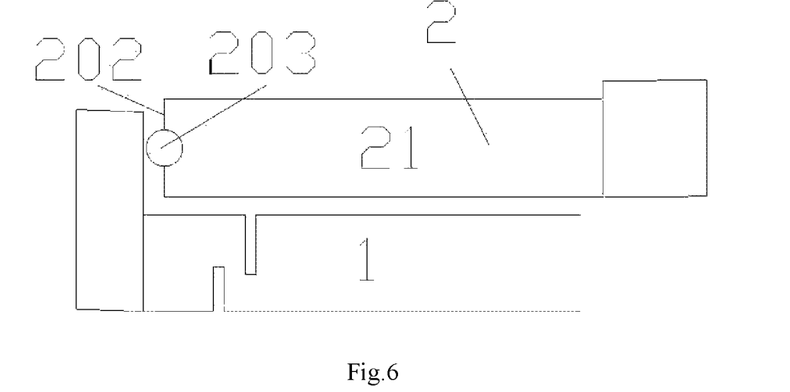
FIG. 6 is a schematic diagram showing a specific embodiment of a second driver of the present disclosure.

As shown in FIG. 6, in an example of the second driver 2, a ball 203 is installed on the end face 202 of the driving rod 21 of the second driver 2 where it is in contact with the first driver 1, in order to reduce the contact area to achieve a point-to-surface contact. The manners of connection between the ball 203 and the second driver 2 is, but not limited to, press-fitting, welding, or bonding.

Figure 7:
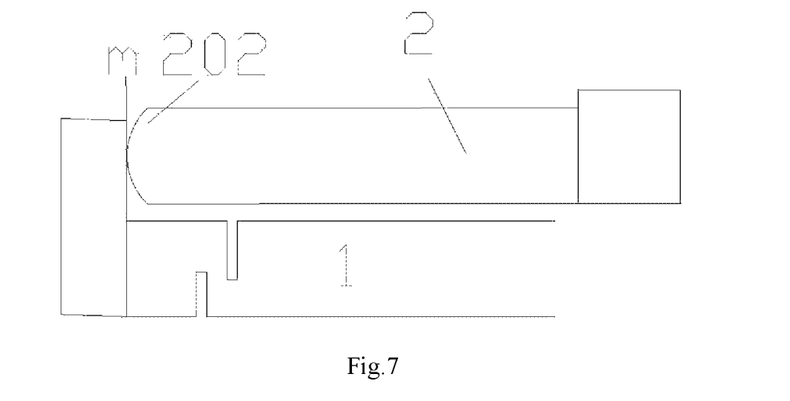
FIG. 7 is a schematic diagram of contact between a second driver and a force-bearing end face of a first driver.
Figure 8:
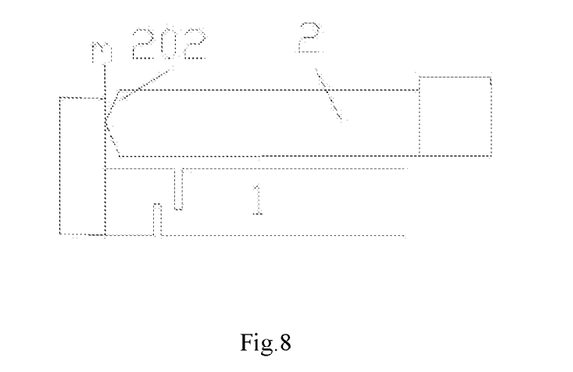
FIG. 8 is a schematic diagram of contact between a second driver and another force-bearing end face of a first driver.

As shown in FIG. 7 and FIG. 8, the end face 202 of the second driver 2 where it is in contact with the force-bearing end face m of the first driver 1 may be provided in a pointed shape or an arc shape to achieve a point-to-surface contact.

In a preferred solution, the driving rod 11 of the first driver 1 and the driving rod 21 of the second driver 2 are made of the same material while have different lengths. Three specific examples are given below.

Example 1

Figure 9:
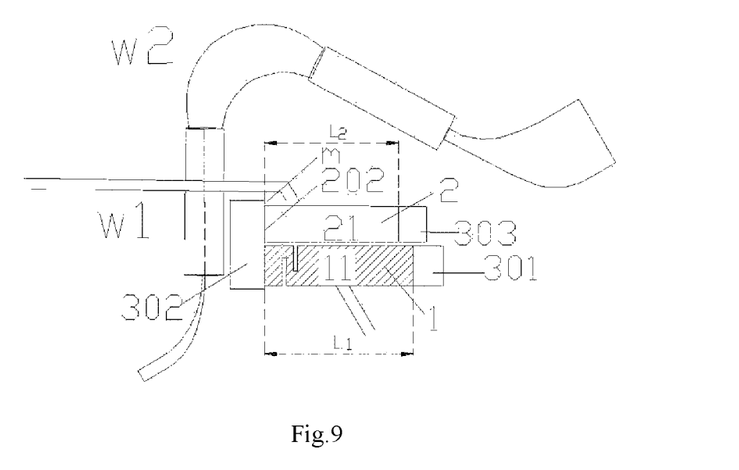
FIG. 9 is a schematic diagram showing a specific embodiment of an apparatus of the present disclosure.

As shown in FIG. 9, the driving rod 11 of the first driver 1 has an elastic structure 12 and a length $L_1$. Both ends of the driving rod 11 are fixed to the two parts w2 and w1 of the divided AWG chip via the base 301 and the base 302. The driving rod 21 of the second driver 2 is secured on the second part w2 of the divided AWG chip, and the position of the base 303 of the second driver 2 placed on the second part w2 of the AWG chip is selected to enable one end face 202 of the second driver 2 to be in contact with the force-bearing face m of the first driver 1. A length $L_2$ of the driving rod 21 of the second driver 2 is configured to be smaller than the length $L_1$ of the driving rod 11 of the first driver 1, and the same material is used for the driving rod 11 of the first driver 1 and the driving rod 21 of the second driver 2.

As shown in FIG. 14, when the temperature—wavelength of the AWG chip is fully compensated, the relative displacement amount per temperature unit of the two parts w1 and w2 of the divided chip is α, and the relationship between the relative displacement dx of the two parts of the divided AWG chip and the temperature variation dT is derived from Formula 1, in which the compensation curve is c, $$\alpha = \frac{dx}{dT} = \frac{dx}{d\lambda}\frac{d\lambda}{dT} = R\frac{m}{n_s d}\frac{n_g}{n_c}\frac{d\lambda}{dT} \qquad \text{[Formula 1]}$$

where α is a relative displacement value required for a wavelength compensation per temperature unit, $n_s$ and $n_c$ are effective refractive indexes of the input/output planar waveguides and the arrayed waveguides of the AWG chip, $n_g$ is a group refractive index, and d is a spacing of adjacent arrayed waveguide on a Roland circle, m is a diffraction order, R is a focal length of the Roland circle, and dλ is a variation value of the center wavelength of the AWG chip.

The expansion and contraction quantity k per temperature unit of the driver caused by thermal expansion-contraction is calculated by Formula 2, $$k = L * \partial \qquad \text{[Formula 2]}$$

Where L is a length of a driving rod, $\partial$ is a linear expansion coefficient of a driving rod.

Figure 10:
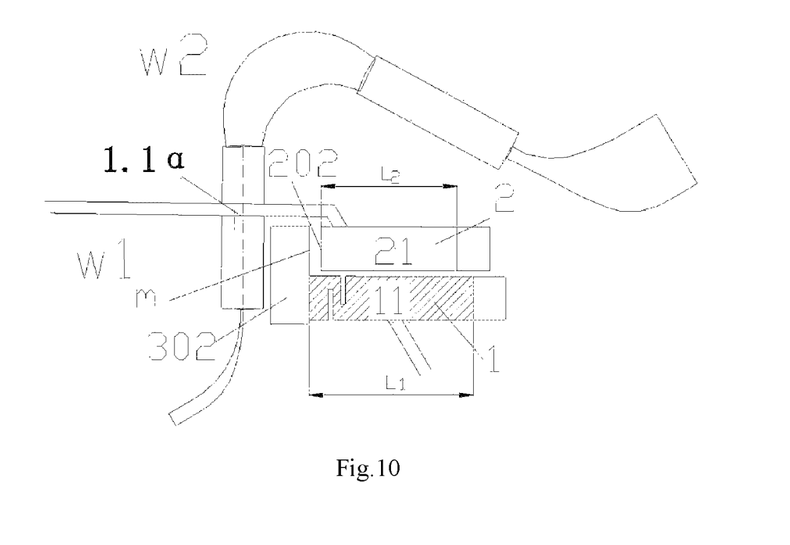
FIG. 10 is a schematic diagram showing a specific embodiment of an apparatus of the present disclosure at a high temperature.

As shown in FIG. 10, when the temperature increases, since the length $L_1$ of the driving rod 11 of the first driver 1 is greater than the length $L_2$ of the driving rod 21 of the second driver 2, and the first driver 1 and the second driver 2 are made of the same material and have the same linear expansion coefficient, then the expansion amount $k_1$ of the first driver 1 per temperature unit is greater than the expansion amount $k_2$ of the second driver 2 per temperature unit, due to the larger expansion of the first driver 1, the force-bearing end face m of the first driver 1 is separated from the end face 202 of the second driver 2, and the first driver 1 pushes the part w1 of the AWG chip to move via the base 302. The movement distance of the chip per temperature unit is the variation amount of the effective length of the first driver 1 per temperature unit, that is, the expansion amount $k_1$. As shown in FIG. 14, when the compensated relative displacement amount $k_1$ per temperature unit of the first driver 1 is greater than α, it is the over-compensation curve c. If it is configured as $k_1 = 1.1\alpha$, then the compensation curve is an over-compensation curve $b_G$ when it is above the normal temperature. The length of the drive rod 11 of the first driver 1 can be calculated from $L_1 = 1.1\alpha/\partial_1$ ($\partial_1$ is the linear expansion coefficient of the drive rod 11 and the drive rod 21).

As shown in FIG. 14, when the temperature decreases, the compensation curve is set as an under-compensation curve, the compensation amount per temperature unit of the AWG chip is the under-compensation amount, for example, it is set to be 0.9α, the compensation curve is the under-compensation curve $a_D$.

Figure 11:
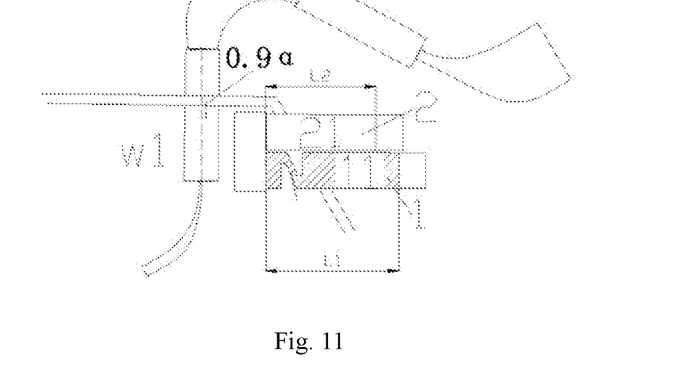
FIG. 11 is a schematic diagram showing a specific embodiment of an apparatus of the present disclosure at a low temperature.

As shown in FIG. 11, when the temperature is lower than the normal temperature, since the length $L_2$ of the driving rod 21 of the second driver 2 is smaller than the length $L_1$ of the driving rod 11 of the first driver 1, the contraction amount of the second driver 2 is smaller than that of the first driver 1. The first driver 1 has an elastic structure 12, the second driver 2 causes the first driver 1 to elastically deform, and the movement distance per temperature unit of the first part w1 relative to the second part w2 of the AWG chip, is jointly affected by the first driver 1 and the second driver 2, the movement distance thereof per temperature unit can be expressed as:

$$\alpha = k_1 + r^* k_2 \quad \text{[Formula 3]}$$

where r is a proportionality coefficient which relates to the rigidity and structural shapes of the two drivers and can be obtained through a stress analysis calculation simulation or experiment.

Then by Formula 3:

$$0.9\alpha = L_1 * \partial_1 + r^* L_2 * \partial_1$$

Therefore, the lengths of the driving rod 11 of the first driver 1 and the driving rod 21 of the second driver 2 are respectively $$L_1 = 1.1\alpha/\partial_1$$

$$L_1 = -0.2/(r^*\partial_1)$$

Example 2

The length $L_1$ of the driving rod 11 of the first driver 1 and the length $L_2$ of the driving rod 21 of the second driver 2 can be configured opposite to those of the example 1. The length of the driving rod 11 of the first driver 1 is smaller than the length of the driving rod 21 of the second driver 2. When the temperature decreases, since the length $L_2$ of the driving rod 21 of the second driver 2 is greater than the length $L_1$ of the driving rod 11 of the first driver 1, the linear expansion coefficient of the driving rod of the first driver 1 is the same with that of the second driver 2, so the contraction amount $k_2$ per temperature unit of the second driver 2 is greater than the contraction amount $k_1$ per temperature unit of the first driver 1, so that the end face 202 of the second driver 2 is separated from the force-bearing end face m of the first driver 1, the first driver 1 pulls the part w1 of the AWG chip a distance of 0.9a via the base 302, the compensation curve is shown as curve $\alpha_D$ in FIG. 14, and the length $L_1$ of the driving rod 21 of the second driver 2 can be calculated by Formula 2.

When the temperature rises above the normal temperature, since the expansion amount of the driving rod 21 of the second driver 2 is greater than that of the driving rod 11 of the first driver 1, and the first driver 1 has the elastic structure 12, the second driver 2 causes the first driver 1 to elastically deform, the first driver 1 causes the relative displacement amount per temperature unit of the AWG chip to be 1.1α through the base 302, the compensation curve is shown as curve $b_G$ in FIG. 14, and the length $L_2$ of the driving rod 21 of the second driver 2 is calculated from formula 3.

Example 3

Figure 12:
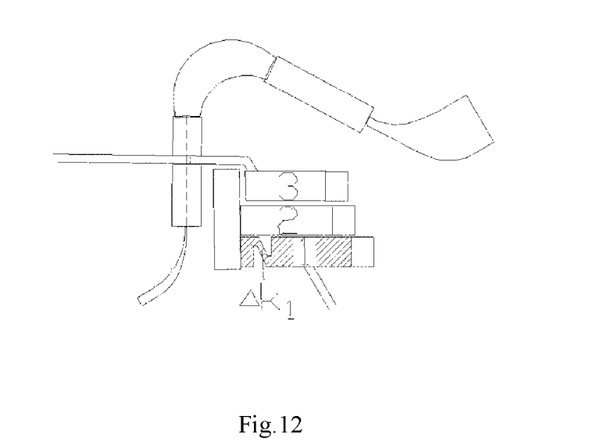
FIG. 12 is a schematic diagram showing an embodiment of an apparatus with three drivers of the present disclosure at a high temperature.
Figure 13:
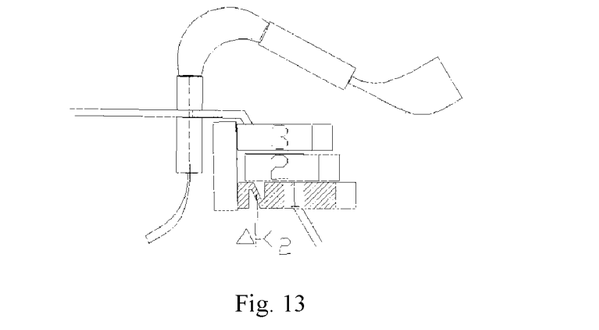
FIG. 13 is a schematic diagram showing an embodiment of an apparatus with three drivers of the present disclosure at a low temperature.

More than two drivers, as shown in FIG. 12, the first driver 1, the second driver 2, and the third driver 3, can be provided. When the temperature is above the normal temperature, in a case that the second driver pushes the first driver to undergo an elastic deformation $\Delta k_1$, the third driver 3 is separated from the first driver 1, and the compensation amount for the displacement of the second part of the AWG chip relative to the first part of the AWG chip is formed by the superposition of the first driver 1 and the second driver 2. As shown in FIG. 13, when it contracts at low temperatures, the second driver 2 is separated from the first driver 1, and the third driver comes into contact with the first driver and causes the first driver to elastically deform at an amount of $\Delta k2$, generating a compensation amount different from the displacement of the second driver 2.

The specific embodiments described herein are merely for the purpose of illustrating the spirit of the present disclosure. A person skilled in the art can make various modifications or additions or substitution to the described specific examples without deviating from the spirit of the present disclosure or going beyond the scope defined by the appended claims.

What is claimed is:

1. An apparatus for bilinear temperature compensation of an arrayed waveguide grating, comprising a first driver having a first driving rod, the two ends of which are respectively connected to a first subsection and a second sub-section of an AWG chip being relatively movable with each other, wherein the apparatus further comprises:
a second driver having a second driving rod with a deformation amount different from that of the first driving rod in a part of a temperature range, one end of the second driving rod being connected to a first subsection of the AWG chip, and the other end being detachably in contact with a force-bearing end face which is relatively fixed to the end face of the first driving rod on the second sub-section;
the first driving rod being provided with a retractable and/or rotatable elastic portion.

2. The apparatus for bilinear temperature compensation of an arrayed waveguide grating according to claim 1, wherein a ball is provided between the second driving rod and the force-bearing end face;
and/or,
an end face of the second driving rod being in contact with the force-bearing end face is in a pointed shape or an arc shape.

3. The apparatus for bilinear temperature compensation of an arrayed waveguide grating according to claim 1, wherein the first driving rod is L-shaped, one side of which is parallel to the second driving rod, and the other side acting as the force-bearing end face is perpendicular to an end face of the second driving rod.

4. The apparatus for bilinear temperature compensation of an arrayed waveguide grating according to claim 1, wherein the first driving rod and the second driving rod have an identical thermal expansion coefficient but different lengths.

5. The apparatus for bilinear temperature compensation of an arrayed waveguide grating according to claim 1, wherein a length $L_1$ of the first driving rod and a length $L_2$ of the second driving rod are subject to following conditions:

$$W\alpha = L_1 * \partial_1 + L_2 * \partial_2$$

$$\alpha = k_1 + r^* k_2$$

where $k_1$ is an expansion and contraction quantity of the first driver caused by thermal expansion and contraction per temperature unit; $k_2$ is an expansion and contraction quantity of the second driver caused by thermal expansion and contraction per temperature unit; r is a proportion coefficient which relates to rigidity and structural shape of the two drivers and may be obtained by a stress analysis calculation simulation or experiment; $\partial_1$ is a linear expansion coefficient of the first driving rod, $\partial_2$ is a linear expansion coefficient of the second driving rod; $\alpha$ is a movement distance per temperature unit; and w is a compensation amount.

6. The apparatus for bilinear temperature compensation of an arrayed waveguide grating according to claim 1, wherein a number of the second driving rods is two and the second driving rods have an identical expansion coefficient as the first driving rod, one of the second driving rods having a length greater than that of the first driving rod, and the other having a length smaller than that of the first driving rod.

7. A method for bilinear temperature compensation of an arrayed waveguide grating, wherein the method comprises:
  driving two subsections of an AMG chip to relatively move with each other by a first driving rod connecting the two subsections of the AMG chip when a temperature varies;
  providing a second driving rod between the two subsections of the AWG chip, one end of the second driving rod being in a detachable contact with a force-bearing end face, and a position of the force-bearing end face and one end face of the first driving rod is relatively fixed; and
  varying an elastic deformation of the first driving rod by a deformation amount of the second driving rod different from that of the first driving rod.

8. The method for bilinear temperature compensation of an arrayed waveguide grating according to claim 7, wherein in a part of temperature range, the first driving rod deforms due to the contact of the second driving rod with the force-bearing end face; in a part of temperature range, the deformation of the first driving rod recovers due to a separation of the second driving rod from the force-bearing end face.

9. The method for bilinear temperature compensation of an arrayed waveguide grating according to claim 7, wherein a length of the second driving rod is greater than that of the first driving rod at a normal temperature; and
  when a temperature is above the normal temperature, an expansion amount of the second driving rod is greater than that of the first driving rod, such that the second driving rod stretches the first driving rod;
  when the temperature is below the normal temperature, a contraction amount of the second driving rod is greater than that of the first driving rod, such that the second drive rod is separated from the force-bearing end face.

10. The method for bilinear temperature compensation of an arrayed waveguide grating according to claim 7, wherein at a normal temperature, a length of the second driving rod is smaller than that of the first driving rod; and
  when a temperature is above the normal temperature, an expansion amount of the second driving rod is smaller than that of the first driving rod, such that the second drive rod is separated from the force-bearing end face;
  when the temperature is below the normal temperature, a contraction amount of the second drive rod is smaller than that of the first drive rod, such that the second driving rod comes into contact with the force-bearing end face to deform the first driving rod.

\* \* \* \* \*